US010659146B2

(12) United States Patent
Frolov et al.

(10) Patent No.: US 10,659,146 B2
(45) Date of Patent: May 19, 2020

(54) METHODS AND APPARATUS FOR AIRBORNE SYNTHETIC ANTENNAS

(71) Applicant: SUNLIGHT AEROSPACE INC., Edison, NJ (US)

(72) Inventors: Sergey V. Frolov, New Providence, NJ (US); Michael Cyrus, Castle Rock, CO (US); Allan J. Bruce, Scotch Plains, NJ (US)

(73) Assignee: SUNLIGHT AEROSPACE INC., Edison, NJ (US)

( * ) Notice: Subject to any disclaimer, the term of this patent is extended or adjusted under 35 U.S.C. 154(b) by 0 days.

(21) Appl. No.: 16/147,127

(22) Filed: Sep. 28, 2018

(65) Prior Publication Data

US 2020/0106518 A1  Apr. 2, 2020

(51) Int. Cl.
*H04B 10/2581* (2013.01)
*H04B 7/185* (2006.01)
*H04L 7/00* (2006.01)
*G01S 1/02* (2010.01)

(52) U.S. Cl.
CPC ............ *H04B 7/18506* (2013.01); *G01S 1/02* (2013.01); *H04L 7/0012* (2013.01)

(58) Field of Classification Search
CPC ...... G01S 13/5242; H01Q 25/00; H01Q 3/36; F41G 7/2293
USPC ....... 342/368, 450, 59, 442; 455/562.1, 431, 455/561; 343/893, 778, 757; 398/25, 79
See application file for complete search history.

(56) References Cited

U.S. PATENT DOCUMENTS

| 3,922,533 | A | * | 11/1975 | Royal | G01S 1/02 235/411 |
| 6,018,659 | A |   | 1/2000 | Ayyagari et al. | |
| 6,188,373 | B1 | * | 2/2001 | Martek | H01Q 1/246 342/375 |
| 6,968,187 | B1 |   | 11/2005 | Irwin et al. | |
| 7,183,967 | B1 | * | 2/2007 | Haendel | F41G 7/2206 342/195 |
| 7,777,674 | B1 | * | 8/2010 | Haddadin | H01Q 1/28 342/368 |
| 9,571,317 | B1 | * | 2/2017 | Kossin | H04L 27/20 |
| 2011/0032149 | A1 | * | 2/2011 | Leabman | H01Q 1/246 342/368 |
| 2011/0114242 | A1 |   | 5/2011 | Kim et al. | |
| 2011/0223851 | A1 |   | 9/2011 | Stoddard | |
| 2012/0013514 | A1 |   | 1/2012 | Yang et al. | |
| 2016/0046387 | A1 |   | 2/2016 | Frolov et al. | |

(Continued)

OTHER PUBLICATIONS

International Search Report for PCT/US2019/052674 dated Jan. 10, 2020.

*Primary Examiner* — Kiet M Doan
(74) *Attorney, Agent, or Firm* — Moser Taboada; Alan Taboada (57) ABSTRACT

Embodiments of an airborne synthetic phased antenna array include a plurality of airborne antennas and phase shifters for the antennas. The antennas are operated coherently, and constant phase shifts between the antennas are maintained. In addition, methods for providing wireless communication services include providing a plurality of airborne platforms, providing RF antennas for wireless communication services and phase shifters for the RF antennas on at least two airborne platforms, and operating the phase shifters to maintain synchronous operation of the RF antennas.

30 Claims, 9 Drawing Sheets

(56) References Cited

U.S. PATENT DOCUMENTS

2017/0311178 A1 10/2017 Feria et al.
2017/0317742 A1* 11/2017 Feria .................... H04L 5/0023

* cited by examiner

METHODS AND APPARATUS FOR AIRBORNE SYNTHETIC ANTENNAS

FIELD

Embodiments of the present principles generally relate to methods and apparatus for airborne wireless communications, and in particular for enabling synthetic antennas using airborne platforms. Non-limiting examples include providing communication links between airborne platforms and ground based equipment using synchronized airborne antennas.

BACKGROUND

Global broadband wireless communications have been growing exponentially in recent years. Network coverage, however, remains incomplete in many regions of the world and even in some currently served regions; thus demand may soon exceed the supply of existing communication infrastructure. Current network technologies are generally too expensive, ineffective, and slow to respond to growing demand. In addition, further proliferation of existing ground-based wireless technologies increases radio-frequency (RF) pollution and human exposure to large amounts of RF energy.

Terrestrial cellular wireless networks are well suited for local area deployments. They are relatively inexpensive, as compared to optical fiber networks, and are the technology of choice in new and emerging markets where the physical infrastructure is limited. Terrestrial cellular wireless networks are appropriate for fixed and mobile users and may be interfaced to wired networks. However, as discrete components, they are range limited and have finite bandwidth. To meet an increasing customer demand, new towers are added to increase the coverage density, while reducing their range to enable increased frequency reuse.

Alternatively, it is possible to establish an aerial network that employs airborne platforms as its main communication hubs. Such hubs would be stationed at altitudes well above commercial airspace, where the line of sight coverage extends over large terrestrial areas. Such a network could work either separately from or together with existing terrestrial mobile phone communication systems. However, one of its potential drawbacks is the limited ability of the airborne antennas to project and concentrate RF emission in small areas on the ground. In wireless cellular communications, where a service area is divided into small cell areas for the purposes of frequency reuse, it is advantageous to be able to project and confine RF emission to these specific small areas, i.e. cell areas. Smaller cell areas allow better frequency reuse and higher throughput per user. The size of the cell area for an airborne antenna is inversely proportional to the antenna's size, so that a larger antenna is more beneficial, since it is capable of producing more concentrated RF emission and smaller cell sizes. Due to the size limitations of a single airborne platform, the size of a single RF antenna may be limited to few meters, which in turn restricts the size of the resulting RF cell area on the ground to no less than several kilometers.

The inventors recognize that this limitation may severely restrict applications of airborne wireless networks. Thus, the inventors believe that there is a strong need for a way to improve the performance of airborne antennas and propose several solutions.

SUMMARY

Embodiments of apparatus for providing distributed airborne wireless communications are provided herein.

In some embodiments, a method of providing wireless communication services includes providing a plurality of airborne platforms, providing RF antennas for wireless communication services and phase shifters for the RF antennas on at least two airborne platforms, and operating the phase shifters to maintain synchronous operation of the RF antennas.

In some embodiments, an airborne synthetic phased antenna array includes a plurality of airborne antennas and phase shifters for the antennas, wherein the antennas are operated coherently, and constant phase shifts between the antennas is maintained.

In some embodiments, a method of providing an airborne synthetic phased antenna array includes providing a plurality of airborne antennas and phase shifters for the antennas, operating the antennas coherently, and maintaining constant phase shifts between the antennas.

Other and further embodiments of the present principles are described below.

BRIEF DESCRIPTION OF THE DRAWINGS

Embodiments of the present principles, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed.

Figure 1:
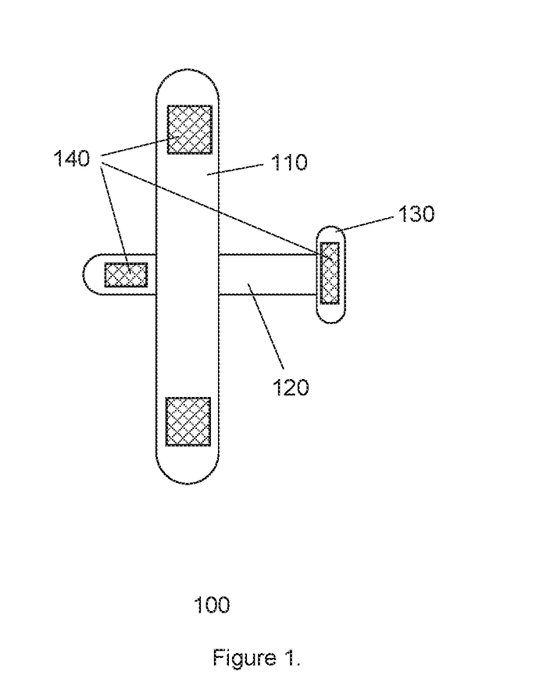
FIG. 1 depicts a schematic view of an airborne communication platform (ACP) in accordance with an embodiment of the present principles.

In accordance with embodiments of the present principles, airborne systems are provided for enabling wireless communications services on the ground and in the air. The systems comprise a fleet of specially equipped unmanned airborne vehicles (UAVs). UAVs carry a distributed payload that comprises wireless communication equipment. A UAV with an associated payload represents an airborne communication platform (ACP). FIG. 1 depicts a schematic view of an airborne communication platform (ACP) 100 in accordance with an embodiment of the present principles. In some embodiments of the present principles, an apparatus, such as the ACP 100 schematically shown in FIG. 1, may comprise a wing 110, a fuselage 120 and a tail 130. The ACP 100 may also include one or more RF antennas 140, as a part of its payload for the purposes of providing communication services to end users on the ground and elsewhere. Other elements of the ACP 100 that are not shown in FIG. 1 may for example include a propulsion system, flight control elements, and additional parts of the payload. The RF antennas 140 may be attached to or integrated with the skin of the airframe and located on the surface of either the wing 110, fuselage 120 or tail 130, as shown in FIG. 1. The RF antennas 140 may also be located inside the airframe body, provided the airframe skin is RF transparent. In addition to fixed-wing aircraft, other airborne vehicles may be used as a basis for an ACP, including helicopters, vertical-take-off-and-landing (VTOL) aircraft, lighter-than-air (LTA) aircraft, tethered aircraft and others.

Different types of RF antennas may be used for the ACP 100, including isotropic (or nearly isotropic) and directional antennas. The former are characterized by a low gain, whereas the latter are characterized by a high gain. The low gain antennas may be used for close range (<1 km) communications between different ACPs, such as air-to-air (ATA) communications. The high gain antennas may be used for long range (>1 km) communications between an ACP and ground-based equipment, such as air-to-user (ATU) communications. The antennas may be tuned to specific carrier frequencies (e.g. 2.0 GHz), or alternatively may be broadband and characterized by a large bandwidth (e.g. from 2.0 to 3.5 GHz).

Figure 2:
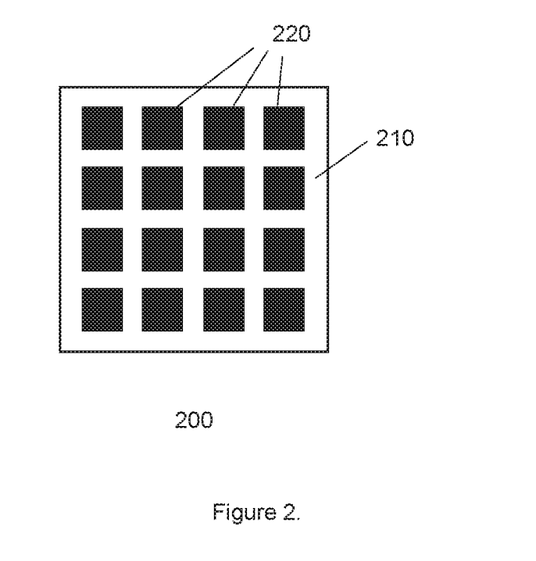
FIG. 2 depicts a directional phased array antenna that may be used on board of the ACP 100 of FIG. 1 in accordance with an embodiment of the present principles.

As an illustrative example, FIG. 2 depicts a directional phased array antenna 200 that may be used on board of the ACP 100 of FIG. 1 in accordance with an embodiment of the present principles. The directional phased array antenna 200 may include a substrate 210 and patch antennas 220. The directional phased array antenna 200 may also include an additional circuitry, which is not shown in FIG. 2, for feeding electrical RF signals to the patch antennas 220. In addition, the phases of the RF signals to different patch antennas 220 may be independently controlled allowing RF beam steering and spatial multiplexing. The RF beam shape and direction may thus be digitally controlled, enabling beam stabilization during flight and synchronization with other antennas. In general, a larger phased array antenna could produce a narrower RF beam, i.e. a larger antenna gain. Therefore, it is more beneficial to have a larger number of patch antennas in an array for long range communications. The patch antennas may be also more widely spaced to further increase the antenna gain. For airborne applications with low weight requirements, a sparse phased array antenna may comprise a smaller number of patch antennas that are spaced at larger than normal distances.

Figure 3:
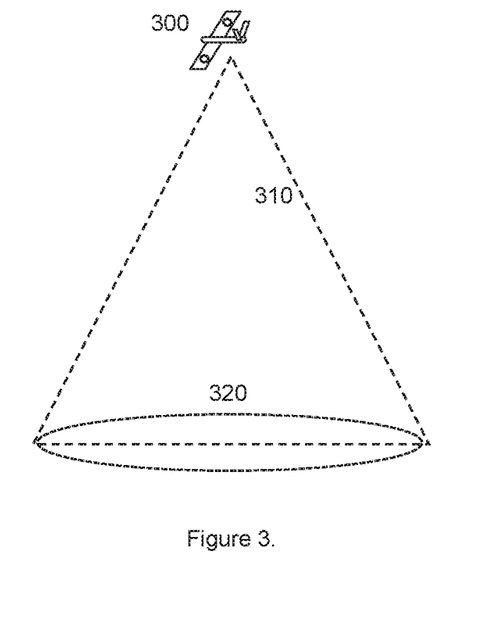
FIG. 3 depicts the operation of an exemplary ACP using the directional phased array antenna of FIG. 2 to project an RF beam to the ground below to form a single cell area.

FIG. 3 illustratively depicts the operation of an exemplary ACP 300 using the directional phased array antenna 200 of FIG. 2 to project an RF beam 310 onto the ground below and, as a result, forming a single cell area 320. In terrestrial cellular networks the cell boundaries are often determined by the propagation distance of the RF signal, the strength of which quickly decreases with the distance from the source (a cell tower). However, in the case of the airborne network, the cell boundaries and a size of the cell may be determined by the shape and size of the RF emission patterns from the airborne antennas, since most of the coverage area may be roughly at the same distance from the airborne antennas. Due to a limited size of the directional phased array antenna 200, the RF beam spread may be large and so the size of the cell 320 may be also relatively large. For example, for the ACP 300 operating at an altitude of 20 km and the RF beam divergence of 30 degrees, the resulting cell size is about 10 km. In order to reduce the cell size, the RF beam divergence must be reduced, which may be achieved by either using a larger antenna or by synthesizing a larger antenna aperture from a number of individual smaller antennas.

Figure 4:
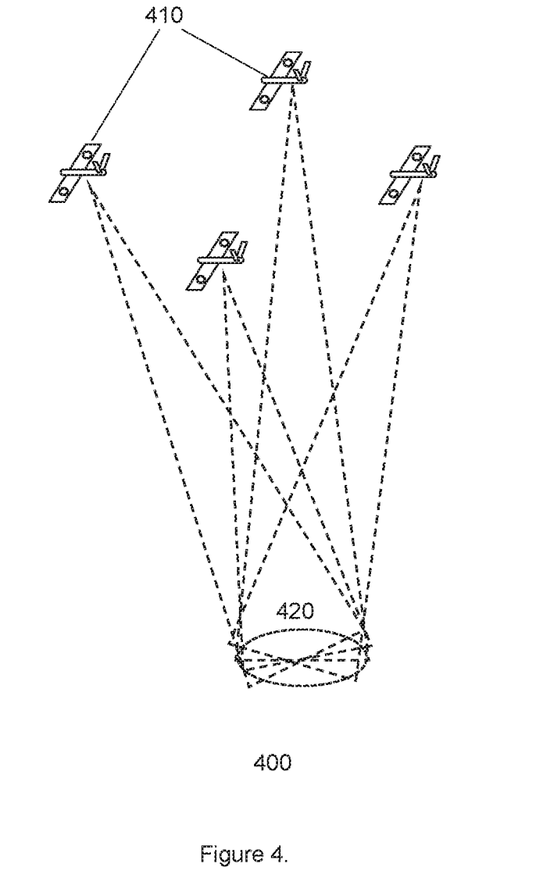
FIG. 4 depicts an ACP fleet comprised of multiple ACPs equipped with directional phased array antennas producing RF beams directed towards the ground in accordance with an embodiment of the present principles.

FIG. 4 schematically depicts an ACP fleet 400 comprised of multiple ACPs 410 equipped with directional phased array antennas 200 producing RF beams directed towards the ground in accordance with an embodiment of the present principles. The RF beams may be coherent with each other, operating at essentially the same frequency, polarization and modulation format. The RF beams may be synchronized and stabilized, so as to keep a constant phase shift between antennas on different ACPs. As a result, a much larger effective antenna aperture may be synthetized as determined by the distance between different ACPs rather than the size of any individual antenna. Thus a much smaller cell area 420 may be produced on the ground as shown in FIG. 4 compared to the scenario illustrated in FIG. 3. The size of the cell area may correspond to the size of either macrocells, metrocells, microcells, or picocells that are typically realized in terrestrial cellular networks. In general, the size of the cell produced by the ACP fleet 400 may be adjustable and varied in response to the demand from the users on the ground. This adjustability of the airborne cellular mapping is enabled by the beam-forming ability of the ACP's antennas. Furthermore, other characteristics of the RF signals, such as carrier frequencies, bandwidth, modulation formats, control logic, and others, may be matched to those in existing terrestrial networks in order to facilitate closer integration and interoperability with existing user equipment, such commercial cellular phones. In addition, the ATU links from the ACP fleet 400 may be tailored for other applications utilizing for example IoT (Internet of Things) automated equipment requiring wireless links with low-bandwidth and wide coverage.

Figure 5:
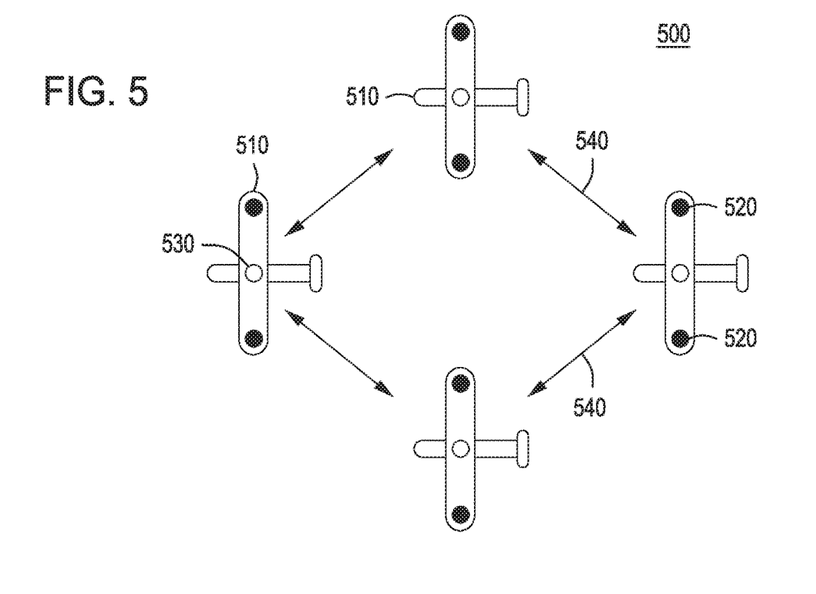
FIG. 5 depicts an ACP fleet comprised of multiple ACPs, each of which is equipped with RF antennas in accordance with another embodiment of the present principles.

FIG. 5 depicts an ACP fleet 500 comprised of multiple ACPs 510, each of which is equipped with RF antennas 520 and 530 in accordance with another embodiment of the present principles. The RF antennas 520 may be used for providing ATU communications, while the RF antennas 530 may be used for providing ATA communications. Alternatively, free-space optical communications may be used for ATA communications. The ATA communications allows ACPs 510 to synchronize the operation of the RF antennas 520, so that they function together as a single interconnected phased array of separate antennas. ATA communications provide channels for passing user data and control data between different ACPs. User data may include voice calls, text messaging, digital data, and so on. Control data may include information about user location, locations about other ACPs 510 in the ACP fleet 500, reference locations, timing information, as well as specific tasking commands enabling shared distributed operations of the ACP fleet 500 as a single network node.

Figure 6:
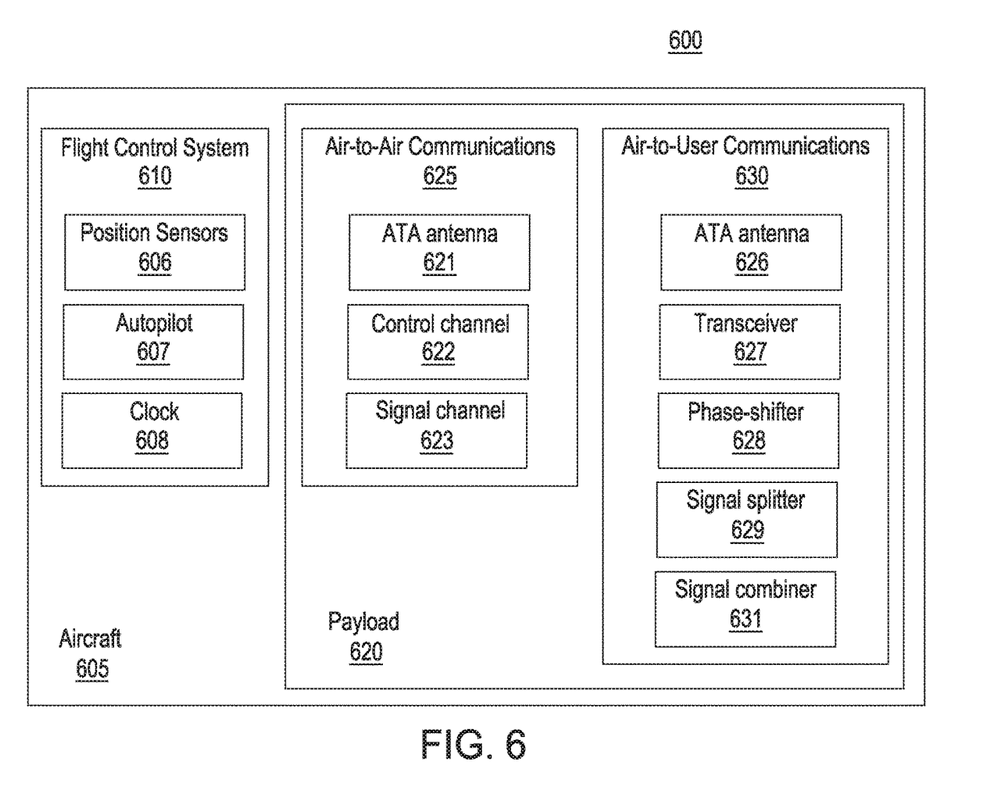
FIG. 6 depicts a high level block diagram of an exemplary ACP, comprising an aircraft, a corresponding flight control system, and a communication payload in accordance with an embodiment of the present principles.

FIG. 6 depicts a high level block diagram of an exemplary ACP 600, comprising an aircraft 605, a corresponding flight control system 610, and a communication payload 620 in accordance with an embodiment of the present principles. The flight control system 610 of FIG. 6 may at least include different sensors, including position sensors 606 and an autopilot system 607. The position sensors 606 may provide precise information about current aircraft position and attitude and the rates of their changes in time (velocity and acceleration), e.g. using an inertial measurement unit (IMU) and Global Positioning System (GPS) (not shown). The autopilot system 607 enables the aircraft to fly autonomously and follow different flight regimes and missions. In addition, the flight control system 610 may also include an accurate clock 608 and a mechanism for synchronizing the clock 608 to an external clock (not shown), for example, by using GPS satellites. The ACP's communication payload 620 may represent only a section of the total payload associated with a fleet of ACPs. It may include at least an ATA communications portion 625 and an ATU communications portion 630. The ATA portion 625 may include an ATA antenna 621, a control channel subsystem 622, and a signal channel subsystem 623. The signal channel subsystem 623 may be used for relaying user data, such as voice, for example during calls. The control channel subsystem 622 can be used for exchanging control data between different ATPs within a same fleet. The ATU communications portion 630 may include an ATU antenna 626, a transceiver 627 for sending and receiving RF signals, a phase-shifter 628, an RF signal splitter 629 and RF signal combiner 631. The transceiver 627 for sending and receiving RF signals may in turn including software-defined radios (SDR) and at least some elements of eNodeB for establishing GSM, LTE, and similar cellular links with existing terrestrial wireless equipment (all not shown). The phase-shifter 628 is used to apply a common phase shift or different phase shifts to the RF signals emitted by the ATU antenna 626 or the constituent parts, respectively. The RF signal splitter 629 and RF signal combiner 631 are used to split and combine RF signals, respectively, that may be sent to and originate from different ACPs. In general, the number of incoming and outgoing RF signals may be as large as the number of ACPs in a fleet.

Figure 7:
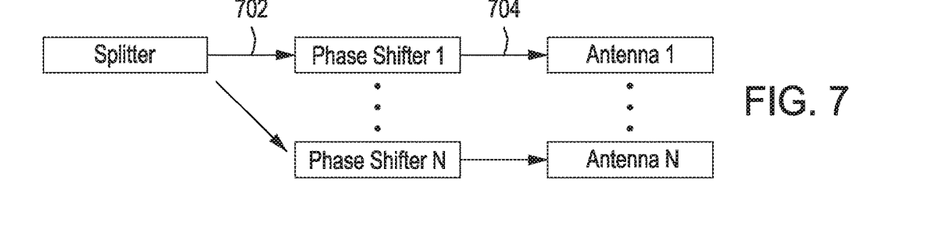
FIG. 7 depicts a block diagram of a process for sending and receiving signals from a fleet of ACPs to user equipment on the ground in accordance with an embodiment of the present principles.

FIG. 7 depicts a block diagram of a process for sending and receiving signals from a fleet of ACPs to user equipment on the ground in accordance with an embodiment of the present principles. As depicted in FIG. 7, at 702 an RF signal is split into N parts by a splitter, such as the RF signal splitter 629 of FIG. 6. The N split parts of the RF signal are communicated, in some embodiments, to N different ACPs via, for example, an ATA communications link. The splitting function may be realized either in the analog or digital domain. The analog splitting may be performed by, for example, an isotropic or low-gain ATA RF antenna in simultaneous transmission of the same signal to multiple ACPs. At each ACP a respective phase-shifter, such as the phase-shifter 628 of FIG. 6, adjusts the phase of the RF signal, which is then transmitted at 704 by an ATU antenna, such as the ATU antenna 626 of FIG. 6, to a user on the ground. In addition, the signal amplitude, timing and modulation may be also adjusted or modified. In such embodiments and arrangements, N different phased antennas may be implemented to accomplish the signal transmission.

Figure 8:
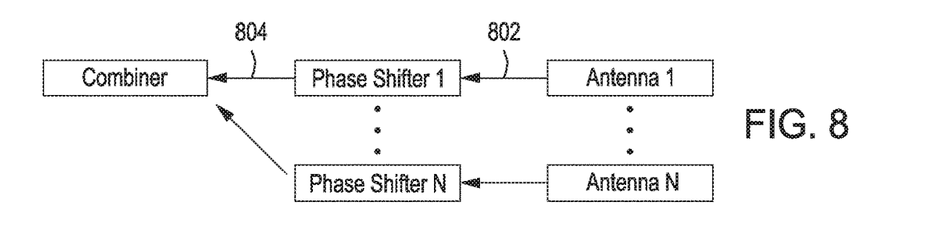
FIG. 8 depicts a block diagram of a process of receiving a signal from a user on the ground in accordance with an embodiment of the present principles.

Similarly, FIG. 8 depicts a block diagram of a process of receiving a signal from a user on the ground in accordance with an embodiment of the present principles. In the embodiment depicted in FIG. 8, the user signal is received at N different ACPs via N respective ATU antennas. The phases of the N received signals are adjusted at 802 using phase shifters, such as the phase shifter 628 of FIG. 6. In FIG. 8, the adjusted signals are combined at 804 using a signal combiner, such as the signal combiner 631 of FIG. 6. In various embodiments in accordance with the present principles, the value of N may range from two to the number of aircraft in a ACP fleet. In some embodiments, various components may possess multiple functions and may be used redundantly for both transmitting and receiving functions. For example, in some embodiments an ATU antenna may be used in a duplex mode, so that the ATU antenna may send and receive RF signals. Alternatively, separate ATU antennas may be used for sending and receiving functions, in order to, for example, reduce RF interference and noise.

Figure 9:
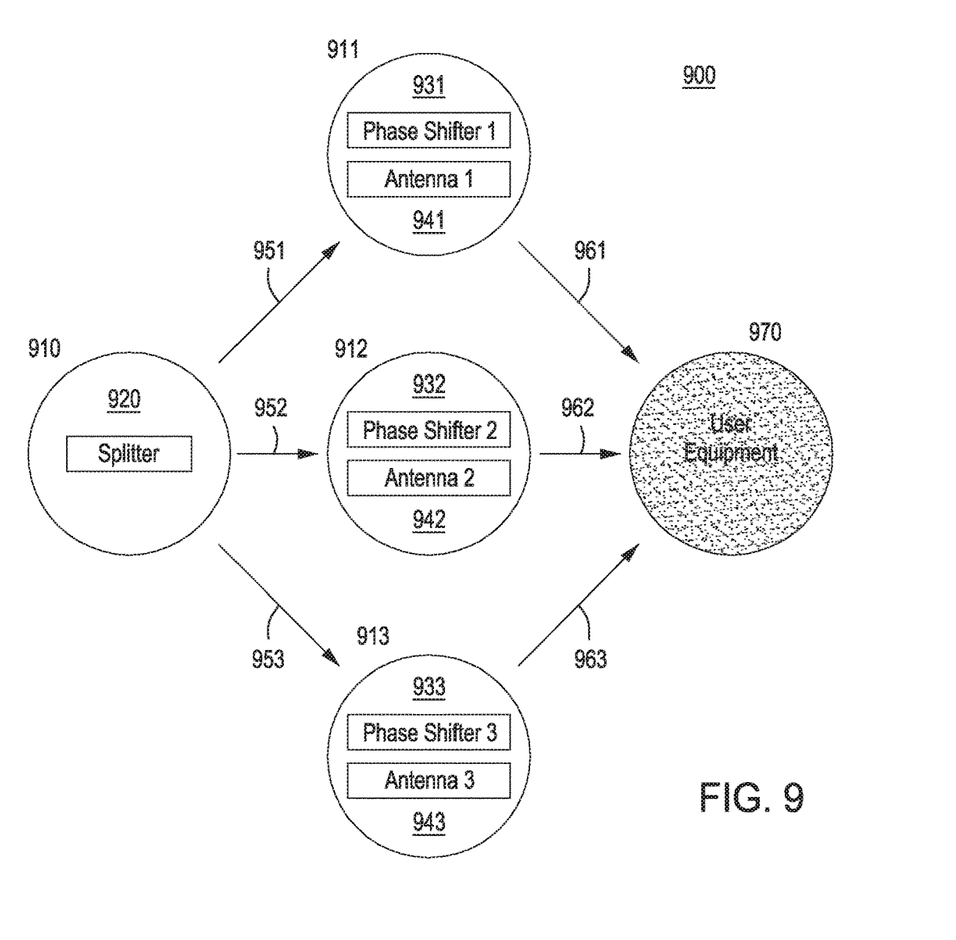
FIG. 9 depicts a block diagram of an airborne wireless system for sending wireless signals in accordance with an embodiment of the present principles.

FIG. 9 depicts a block diagram of an airborne wireless system 900 for sending wireless signals in accordance with an embodiment of the present principles. The airborne wireless system 900 of FIG. 9 illustratively includes several ACPs 910-913, in which the ACP 910 includes a signal splitter 920, and the ACPs 911-913 include phase shifters 931-933 and ATU antennas 941-943, respectively. In addition, airborne wireless system 900 of FIG. 9 includes ATA communication links 951-953 for transmitting signals from the ACP 910 to ACPs 911-913, respectively. The signals may be transmitted as data packets for easier routing. Additional data may be transmitted along with the signals, including the target location (or a direction) of the user for which the signals are intended. To facilitate the synchronization and cross-referencing among ACPs 911-913, the signal splitter 920 may also provide a reference position or reference plane (e.g. a geometric reference surface with a normal originating from a location of a user or a cell center) for the ATU antennas 941-943 and an accurate time reference, which may be obtained from a flight control module. Synchronized and cross-referenced ATU beams 961-963 may then form a common RF radiation pattern producing a cell area on the ground encompassing a target user equipment 970. In alternate embodiments, the airborne wireless system 900 may not require a separate ACP 910 for hosting the signal splitter 920. Instead, the signal splitter 920 may be collocated with other elements of the airborne wireless system 900 on one of the ACPs 911-913.

Figure 10:
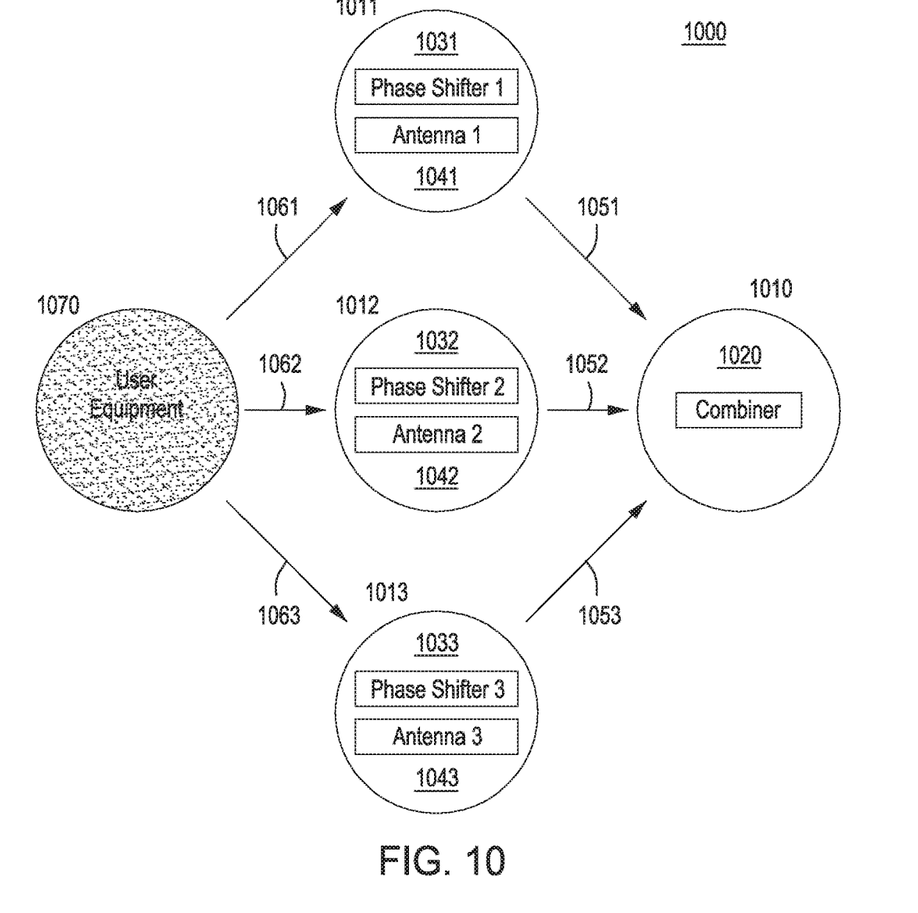
FIG. 10 depicts a block diagram of an airborne wireless system for receiving wireless signals in accordance with an embodiment of the present principles.

FIG. 10 depicts a block diagram of an airborne wireless system 1000 for receiving wireless signals in accordance with an embodiment of the present principles. The airborne wireless system 1000 of FIG. 10 consists of several ACPs 1010-1013, in which the ACP 1010 includes a signal combiner 1020, and the ACPs 1011-1013 include phase shifters 1031-1033 and ATU antennas 1041-1043, respectively. In addition, the airborne wireless system 1000 includes ATA communication links 1051-1053 for transmitting signals from the ACPs 1011-1013 to the ACP 1010, respectively. Additional data may be transmitted along with the signals, including the location of the user, a reference position and a time reference. ATU beams 1061-1063 from the user 1070 to the ACPs 1011-1013 are received separately by the antennas 1041-1043, respectively. In alternate embodiments, the airborne wireless system 1000 may not require a separate ACP 1010 for hosting the signal combiner 1020. Instead, the signal splitter 1020 may be collocated with other elements of the airborne wireless system 1000 on one of the ACPs 1011-1013. Furthermore, the elements of both systems 900 and 1000 can be combined into one system capable of both sending and receiving wireless signals from ground-based users.

Figure 11:
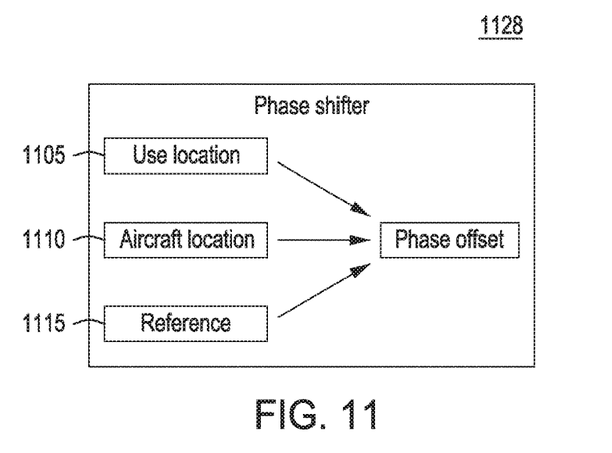
FIG. 11 depicts a block diagram of the operation of a phase shifter in accordance with an embodiment of the present principles.

FIG. 11 depicts a block diagram of the operation of a phase shifter 1128 in accordance with an embodiment of the present principles. The phase shifter 1128 provides an offset for one or more RF signals to be sent or received by an ATU antenna. The phase offset (or offsets) is calculated using information about the location 1105 of the target area on the ground (e.g. where a projected cell area or a target user is located). To impart a correct phase offset, additional information is required, such as location of a reference point (or a plane) 1115 and an exact location 1110 of an aircraft (i.e. the ATU antenna of the aircraft). The latter is subject to constant changes due to aircraft movement and rotation, therefore continuous and real-time updates of the aircraft position are necessary to produce an accurate phase offset. Therefore, the phase offset may be a fast varying parameter (or parameters) applied to RF signals and updated at rates for example ranging from 10 Hz to 10 kHz, as determined by the rate of change in the aircraft position vs the reference position. The phase offset ensures a constant phase difference is maintained between different ATU antennas, resulting in a well-defined RF beam direction towards a pre-defined cell area on the ground and the cell boundaries. The ATU antennas located on different ACPs may be similar to each other to simplify beam forming. The ATU antennas themselves may be phased array antennas, allowing simultaneous application of multiple phase shifts and thus correcting instantaneous changes in an aircraft's attitude.

Figure 12:
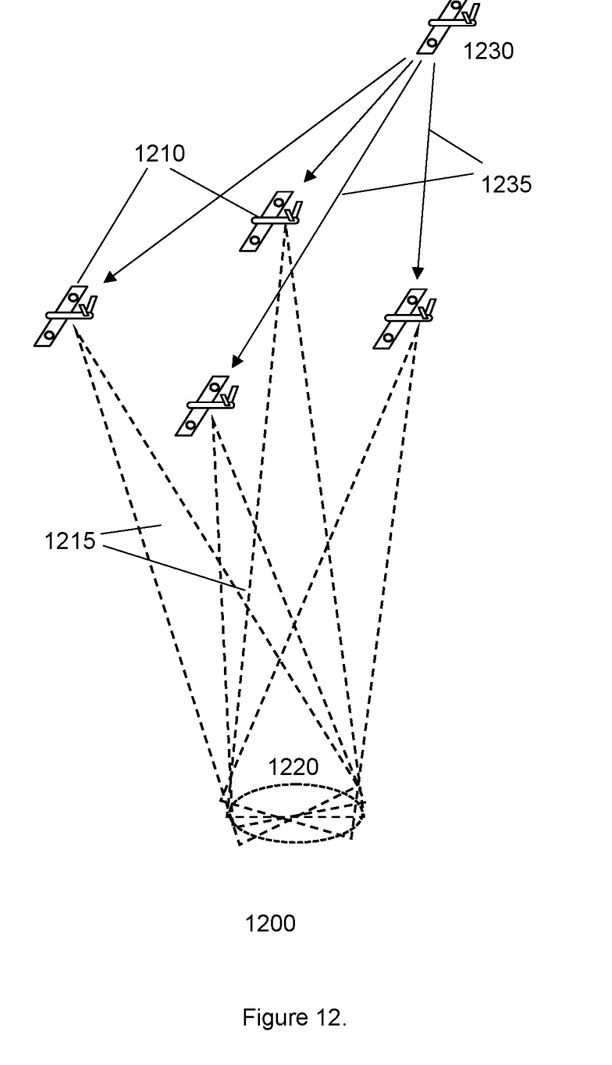
FIG. 12 depicts a diagram of an ACP fleet in accordance with an embodiment of the present principles.

FIG. 12 depicts a diagram of an ACP fleet in accordance with an embodiment of the present principles. The ACP fleet 1200 of FIG. 12 illustratively comprises multiple ACPs 1210 equipped with ATU antennas producing RF beams 1215 directed towards the ground. The RF beams 1215 may be coherent, synchronized and stabilized, so that a much larger effective antenna aperture may be synthetized as determined by the size of the ACP fleet 1200 rather than the size of any individual antenna. As a result, a cell area 1220 may be produced on the ground forming an ATU link. In addition, the ACP fleet 1200 may include an ACP 1230, which may carry either a splitter, a combiner or both sections of the ACP fleet communication payload. The ACP 1230 may be also have an ATU antenna and directly participate in the formation of the cell area 1220. The ACPs 1210 and 1230 may also have means for establishing wireless ATA links, e.g. such as links 1235 for linking the ACP 1230 with every other ACP 1210. The links 1235 may then be used for relaying user data to and from the ACP 1230 and controlling RF beams on the ACP 1210. The ACP 1230 may fly at the same altitude as the rest of the ACP fleet 1200 or at a different altitude, e.g. above or below the average altitude of the fleet 1200. Flight at different altitudes may improve ATA communications, for example, by enabling either the use of high gain antennas in the case RF communications are used for establishing the ATA links, or the use of point-to-point free-space optics in the case of using optical communications for establishing the ATA links.

Figure 13:
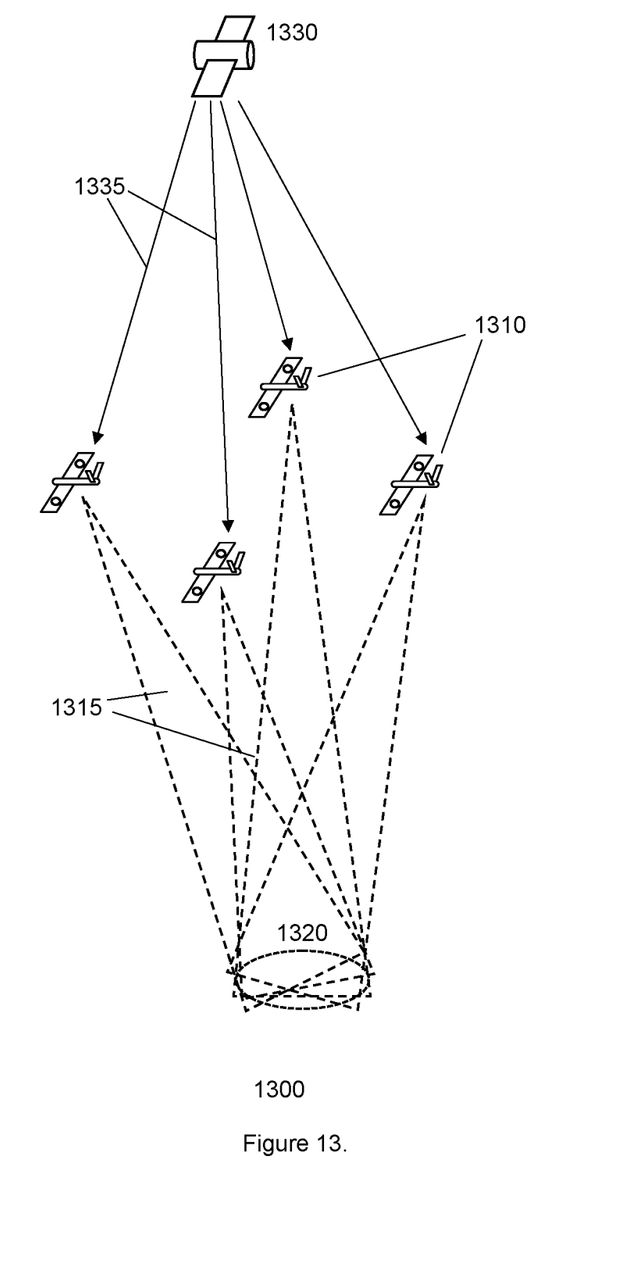
FIG. 13 depicts a diagram of an ACP fleet in accordance with an alternate embodiment of the present principles.

FIG. 13 depicts a diagram of an ACP fleet in accordance with an alternate embodiment of the present principles. The ACP fleet 1300 of FIG. 13 illustratively comprises multiple ACPs 1310 equipped with ATU antennas producing RF beams 1315 directed towards the ground. The RF beams may be coherent, synchronized and stabilized, so that a cell area 1320 may be produced on the ground as shown in FIG. 13 forming an ATU link. The ACP fleet 1300 may be also a part of a larger communication system, which may also include a communication satellite 1330, which may carry either a splitter, a combiner or both sections used in support the ACP fleet communication payload that at least includes phase shifters and ATU antennas, as described above, distributed among different ACPs. The satellite 1330 may also have means for establishing wireless links 1335 with every ACP 1310, using either RF antennas or free-space optics. The links 1335 may then be used for relaying user data to and from the satellite 1330 and controlling RF beams on the ACP 1310. The satellite 1330 may also have communication links with other communications satellites and terrestrial communication systems for relaying user data and control signals.

Figure 14:
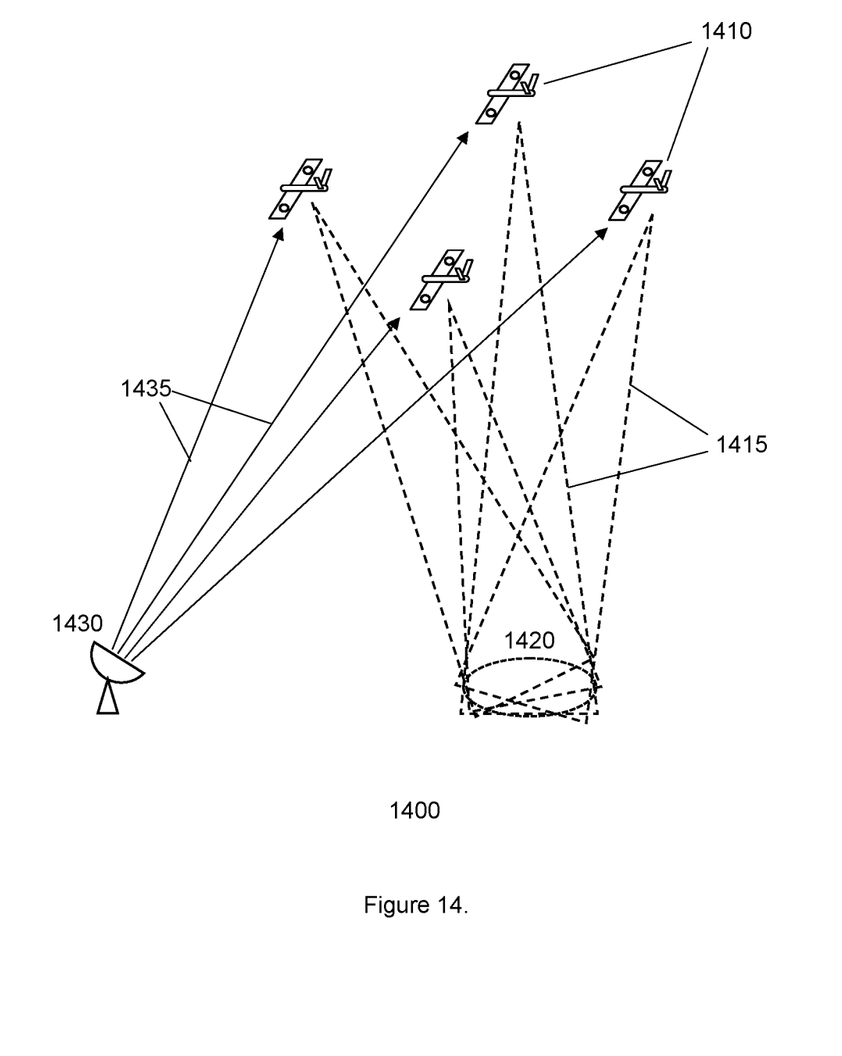
FIG. 14 depicts a diagram of an ACP fleet in accordance with an alternate embodiment of the present principles.

FIG. 14 depicts a diagram of an ACP fleet in accordance with an alternate embodiment of the present principles. The ACP fleet 1400 of FIG. 14 illustratively comprises multiple ACPs 1410 equipped with ATU antennas producing RF beams 1415 directed towards the ground. The RF beams may be coherent, synchronized and stabilized, so that a cell area 1420 may be produced on the ground forming an ATU link. The ACP fleet 1400 may be also a part of a larger communication system, which may also include a terrestrial station 1430, which may carry either a splitter, a combiner or both used in support of the ACP fleet communication payload that at least includes phase shifters and ATU antennas, as described above, distributed among different ACPs. The station 1430 may also have means for establishing wireless air-to-ground (ATG) links 1435 with at least some ACP 1410, for example, using high-gain RF antennas. Specifically the ATG links 1435 may be realized using phased-array antennas, which in turn may produce multiple RF beams focused on different ACPs 1410. Alternatively, the station 1430 may produce a single RF beam covering the extent of the ACP fleet 1400. The data and signals within such an RF beam may be provided to all linked ACPs simultaneously, wherein the information received from the station 1430 is essentially the same. Alternatively, separate communication channels can be established within the same RF beam, for example using frequency, time or code division multiplexing. The links 1435 may then be used for relaying user data to and from the station 1430 and controlling RF beams on the ACP 1410. The station 1430 may also have communication links (wired or wireless) with other terrestrial communication systems for relaying user data and control signals.

In accordance with the present principles, an ACP fleet may serve multiple cell areas at the same time. Each cell area may be projected by a specific combination of RF beams produced by different ACPs with specific set of phase offsets between them. As a result, each ACP's ATU antenna may be emitting multiple RF beams with different phase offsets corresponding to different cell areas without interfering with each other. This signal overlay between multiple cells areas may be done in either the digital or analog domain. Generally, digital signal synthesis is more efficient and versatile.

In accordance with embodiments of the present principles, an ACP fleet may fly directly above its service area to minimize the signal propagation distance. The service area may move as well together with the ACP fleet. Alternatively, the service area may be stationary due to intrinsic beam steering capabilities of the synthetized ACP antenna array as described above, in which any relative and absolute changes in any or all of the ACP's position may compensated by the phase shifters on board the ACPs. The service area may comprise multiple cell areas, each characterized by size, shape and reference location. To minimize interference, neighboring cells areas may be serviced using different frequency or modulation format (e.g. different spreading codes). The relative positions among different ACPs in the fleet may be kept nearly constant to simplify operation and maintain the same level of performance. For example, a four-ACP fleet may maintain a continuous diamond formation as shown in FIG. 5. Many other formations are possible with the number of aircraft ranging from 2 to 10 or more. An ACP fleet as a whole may fly different paths. The preferred path may be a circular path at a constant altitude centered above the service area. Different formation patterns may be used and these patterns may be changed in flight depending on application requirements. Some formation patterns, such as close V-formations where ACPs may fly in each other's wake, may provide aerodynamic benefits by reducing drag and propulsion power for fixed-wing platforms. These ACP fleet formations may be particularly beneficial for airborne wireless systems, as they optimize the performance of both the airborne platforms and their communication payloads.

While the foregoing is directed to embodiments of the present principles, other and further embodiments of the invention may be devised without departing from the basic scope thereof.

The invention claimed is:

1. A method of providing wireless communication services, comprising:
  providing a plurality of airborne platforms,
  providing flight control systems for the airborne platforms, wherein the flight control systems include at least an autopilot, position sensors and a clock,
  providing RF antennas for wireless communication services and phase shifters for the RF antennas on at least two airborne platforms,
  operating the RF antennas to, at least one of, receive and transmit RF beams, and
  operating the phase shifters to maintain a constant phase difference between the RF beams of the at least two airborne platforms throughout movement of at least one of the at least two airborne platforms by adjusting a phase of at least one of the RF beams to compensate for movement between the at least two airborne platforms.

2. The method of claim 1, further comprising providing a signal splitter on at least one of the airborne platforms.

3. The method of claim 1, further comprising providing a signal combiner on at least one of the airborne platforms.

4. The method of claim 1, further comprising producing coherent RF emission using the RF antennas.

5. The method of claim 1, further comprising receiving coherent RF emission using the RF antennas.

6. The method of claim 1, further comprising defining a reference location for the synchronous operation of the RF antennas.

7. The method of claim 1, further comprising providing clocks for the airborne platforms and means for synchronization among the clocks.

8. The method of claim 1, further comprising defining a cell service area and determining phase offsets for the phase shifter to produce the cell service area.

9. The method of claim 1, wherein the RF antennas are phased array antennas.

10. The method of claim 1, wherein the airborne platforms comprise wing surfaces and the RF antennas are integrated in the wing surfaces.

11. The method of claim 1, further comprising means for air-to-air communications between the airborne platforms.

12. The method of claim 11, wherein the means for air-to-air communications is one of RF antennas and free-space optics.

13. The method of claim 1, further comprising establishing signal and control communication channels between the airborne platforms for transferring user and control data respectively.

14. The method of claim 13, further comprising transferring information about user location, reference location and timing using the control channel.

15. The method of claim 1, further comprising determining locations of the airborne platforms in real time and using the phase shifters to compensate for changes in the locations to stabilize the synchronous operation of the RF antennas.

16. The method of claim 1, further comprising determining attitudes of the airborne platforms in real time and using the phase shifters to compensate for changes in the attitudes to stabilize the synchronous operation of the RF antennas.

17. The method of claim 1, wherein each of the phase shifters provides multiple phase shifts to at least one RF antenna.

18. The method of claim 1, further comprising providing transceivers for sending and receiving RF signals.

19. The method of claim 1, wherein the airborne platforms are at least one of a fixed-wing aircraft, a helicopter, a vertical-takeoff-and-landing aircraft and a lighter-than-air airship.

20. The method of claim 1, further comprising defining multiple cell areas and associated reference locations, determining phase offsets for the cell areas and proving simultaneous communications with the cell areas using the RF antennas and the phase shifters.

21. The method of claim 1, further comprising providing a separate airborne platform with one of a signal splitter and signal combiner.

22. The method of claim 1, further comprising providing a communication satellite with one of a signal splitter and signal combiner.

23. The method of claim 1, further comprising providing a terrestrial station with one of a signal splitter and signal combiner.

24. The method of claim 1, further comprising arranging the airborne platforms in a formation.

25. The method of claim 24, wherein the formation is a close formation and wherein at least one aircraft is positioned in a wake of another aircraft.

26. The method of claim 1, further comprising establishing air-to-ground communications with ground-based equipment using the synchronous operation of the RF antennas.

27. A method of providing an airborne synthetic phased antenna array, comprising:
for each of a plurality of airborne platforms,
providing a plurality of airborne antennas and phase shifters for the plurality of airborne antennas,
providing flight control systems, wherein the flight control systems include at least an autopilot, position sensors and a clock,
operating the plurality of airborne antennas coherently, and
using the phase shifters, maintaining constant phase offsets between the plurality of airborne antennas throughout movement of at least one of the plurality of the airborne antennas by adjusting a phase of at least one of a signal received by at least one of the plurality of airborne antennas and a signal transmitted by at least one of the plurality of airborne antennas to compensate for movement between the airborne antennas.

28. The method of claim 27, wherein the operating the antennas comprises one of emitting and receiving electromagnetic waves.

29. The method of claim 27, wherein the constant phase shift is maintained using information about antenna locations and reference locations.

30. The method of claim 27, wherein the airborne antennas are part of a payload on board of a fleet of one of fixed-wing aircraft, tethered aircraft and lighter-than-air airships.

* * * * *